United States Patent [19]
Richards et al.

[11] 3,798,981
[45] Mar. 26, 1974

[54] MECHANICAL TRANSFER BAR DRIVE ASSEMBLY

[75] Inventors: Robert W. Richards, Sterling Heights; James Egbert, Union Lake, both of Mich.

[73] Assignee: La Salle Machine Tool, Inc., Warren, Mich.

[22] Filed: Oct. 2, 1972

[21] Appl. No.: 294,227

[52] U.S. Cl. .................................................. 74/40
[51] Int. Cl. ............................................. F16h 21/32
[58] Field of Search ...................... 74/40, 41, 42, 45

[56] References Cited
UNITED STATES PATENTS

| | | | |
|---|---|---|---|
| 2,574,137 | 11/1951 | Zenner | 74/40 |
| 1,900,735 | 3/1933 | Pomeroy | 74/41 |
| 1,943,071 | 1/1934 | Harstick | 74/41 |
| 2,858,702 | 11/1958 | Schneider | 74/40 |
| 2,595,580 | 5/1952 | Hill | 74/45 |
| 2,705,980 | 4/1955 | Papworth | 74/45 |

FOREIGN PATENTS OR APPLICATIONS

| | | | |
|---|---|---|---|
| 474,342 | 10/1937 | Great Britain | 74/40 |
| 663,087 | 12/1951 | Great Britain | 74/40 |

*Primary Examiner*—Benjamin W. Wyche
*Assistant Examiner*—Wesley S. Ratliff, Jr.
*Attorney, Agent, or Firm*—Olsen and Stephenson

[57] ABSTRACT

A drive mechanism for imparting simple harmonic motion to the transfer bar in a mechanism for moving workpieces in a generally horizontal direction through a plurality of work stations. The drive mechanism comprises a drive shaft, a drive crank secured to the drive shaft, a drive link pivotally mounted intermediate its ends on the drive crank and a carriage releasably attached to the transfer bar. The carriage is guidably supported for horizontal movement, and is pivotally connected to one end of the drive link. The opposite end of the drive link is guidably supported during certain portions of the movement thereof to assure continuous movement of the transfer bar in one direction in response to one half-cycle movement of the drive crank and continuous movement of the transfer bar in the opposite direction in response to another half cycle movement of the drive crank.

8 Claims, 9 Drawing Figures

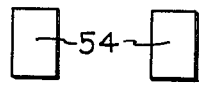
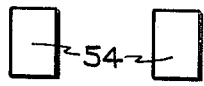
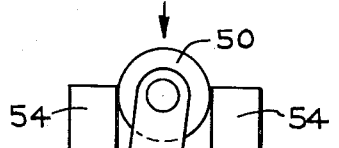
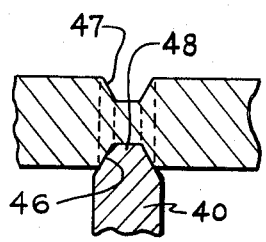

3,798,981

MECHANICAL TRANSFER BAR DRIVE ASSEMBLY

BACKGROUND OF THE INVENTION

Automated machine tool equipment now in use utilizes transfer bars movable in a horizontal direction for transferring workpieces from one station to the next. Since the ultimate object of transfer bar operation is to move the workpieces as quickly as possible to predetermined accurately located positions, and since the workpieces constitute a fairly large mass, a motion of the transfer bar in which it is first moved slowly with a large force, subsequently moved rapidly, and then moved at a slower speed to a final position is desirable. This type of movement of the transfer bar not only achieves rapid movement of the workpieces but also improves the ability of the transfer bar to accurately locate the workpieces at the work stations. Various mechanisms have been devised in the past in an attempt to achieve these objectives. These mechanisms have met with varying degrees of success from the standpoint of cost, complexity, and operability. The principal object of this invention is to provide an improved drive mechanism capable of imparting simple harmonic motion to the transfer bar.

SUMMARY OF THE INVENTION

The drive mechanism of this invention comprises a drive shaft, a drive crank secured to the drive shaft, a drive link pivotally mounted intermediate its ends on the drive crank, and a carriage guidably supported for horizontal movement and releasably attached to the transfer bar. Coacting cam and cam follower means on the main frame for the mechanism and the drive link assure continuous movement of the transfer bar in one direction in response to one half cycle movement of the drive crank and continuous movement of the transfer bar in an opposite direction in response to the other half cycle movement of the drive crank. The resulting mechanism for driving the transfer bar is referred to as a "hypo-cycloidal drive." This mechanism has torque requirements which enables use of a reasonably sized power train and imparts simple harmonic motion to the transfer bar, this motion being considered ideal from the standpoint of acceleration and velocity characteristics for moving parts between work stations.

A spring pressed pin and recess assembly on the carriage and the transfer bar provides for the releasable connection of the carriage to the transfer bar. As a result, in the event the movement of the transfer bar is obstructed, the pin will be released from the recess so that the drive mechanism will not be damaged.

Further objects, features and advantages of this invention will become apparent from a consideration of the following description, the appended claims, and the accompanying drawing in which:

FIG. 1 is a front view of the hypo-cycloidal drive mechanism of this invention shown in assembly relation with a mechanical transfer assembly;

FIGS. 2–5, inclusive, are diagrammatic views of the drive mechanism of this invention showing the mechanism in progressively moved positions;

FIG. 6 is a sectional view of a portion of the mechanism of this invention as seen from the line 6—6 in FIG. 1, illustrating the releasable latch mechanism that connects the carriage and the transfer bar;

FIG. 7 is a fragmentary view of a portion of the latch mechanism as seen from the line 7—7 in FIG. 6;

Figure 1:
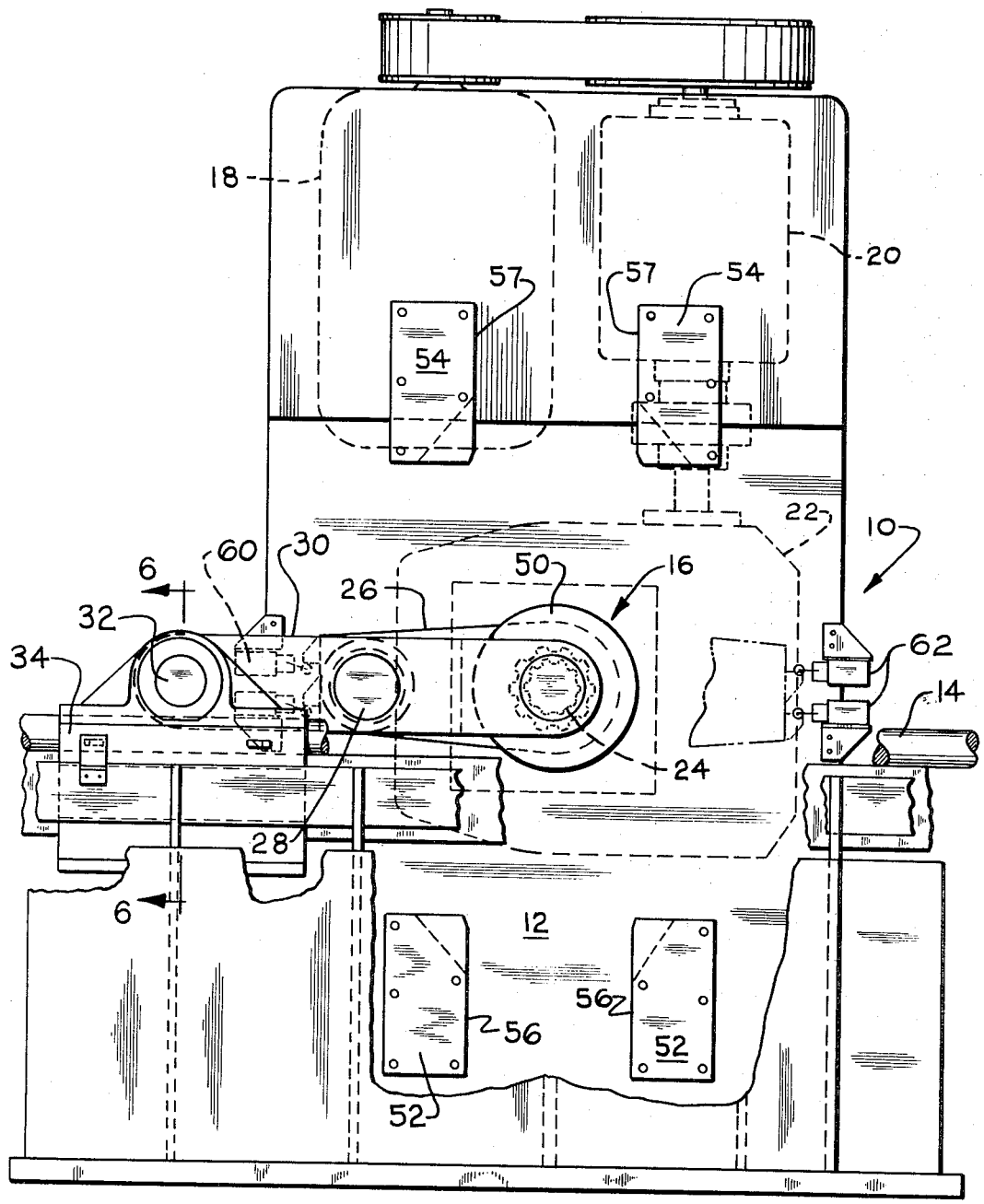

The mechanical transfer assembly of this invention, indicated generally at 10, illustrated in FIG. 1, as including a main frame 12 on which a transfer bar 14 is mounted for back and forth horizontal movement in response to operation of a hypo-cycloidal drive mechanism 16. A motor 18, mounted on the main frame 12, drives a clutch and brake assembly 20 which is in turn connected to a gear mechanism, indicated generally at 22 which in turn drives a drive shaft 24.

A drive crank 26 is secured at one of its ends to the drive shaft 24 and at the opposite end carries a pivot member 28. A drive link 30 is pivotally mounted intermediate its ends on the pivot 28 and is pivotally connected by a pin 32 at one end to a carriage 34. The carriage 34 is in turn guidably supported on a horizontal guide rail 36 (FIG. 6) carried by the frame 12.

The transfer bar 14 is releasably connected to the carriage 34 by a latch mechanism 38 (FIG. 6). The mechanism 38 consists of an upright pin 40 which is guidably supported in a tube 42 on the carriage 34 for upward movement in response to the urging of a compression spring 44. The compression spring 44 urges the pin 40 upwardly into a cam shape slot 46 in the transfer bar 14. As shown in FIG. 7, the pin 40 has a tapered upper end portion 48 which fits in the slot 46 and is releasably retained therein by the spring 44 and as to lock the carriage 34 to the transfer bar 14. As a result, horizontal movement of the carriage 34 will be transmitted directly to the transfer bar 14 when the pin 40 is in its position shown in FIGS. 6 and 7. In the event, however, that the transfer bar 14 strikes an obstruction or is otherwise prevented from moving in a horizontal direction, the pin 40 will be urged downwardly against the action of the spring 44 by a cam shape edge 47 of the recess 46 so as to release the transfer bar 14 from the carriage 34 and prevent damage to the drive mechanism 16.

As shown in FIGS. 2–5, the end of the drive link 30 remote from the carriage 34 has a roller 50 supported thereon. The roller 50 is intended for cooperation with cam members 52 disposed below the transfer bar 14 and cam members 54 disposed above the transfer bar 14. The lower cam members 52 are spaced apart and have upright inner cam surfaces 56 which form a lower track section for the roller 50. The upper cam members 54 are similarly spaced apart and have upright inner cam surfaces 57 which form a vertically extending upper track section.

The track sections function to confine the roller 50 and thus discipline the movement of the drive link 30. By virtue of this discipline, the transfer bar 14 will be moved continuously in one horizontal direction for each half cycle movement of the drive crank 26.

In the use of the assembly 10, assume that the drive crank 26 and the drive link 30 are in positions illustrated in FIG. 2, in which positions the cam follower roller 50 is confined between the lower cam members 52. With the drive crank 26 rotating in the counterclockwise direction indicated by the arrow in FIG. 2, the carriage 34 is being continuously moved toward the right as viewed in FIG. 2. This continuous movement of the carriage 34 and thus the transfer bar 14 from left to right takes place during the half cycle movement of the drive crank 26 commencing with the crank 26 in a substantially horizontal position in which the pivot 28 is to the left of the shaft 24 and ending with the drive crank 26 in a substantially horizontal position in which the pivot 28 is on the right side of the drive shaft 24. During movement of the drive crank 26 between these two positions, the crank 26 extends downwardly from the drive shaft 24. This half cycle movement of the drive crank 26 could be utilized to achieve work movement of the transfer bar 14. The cam members 52 cooperate with the roller 50 to insure this continuous movement of the transfer bar 14 by insuring that the drive link 30 will be rotated in a clockwise direction as viewed in FIG. 2 during the time that the drive link 30 passes through a position in which it is parallel to the drive crank 26. Without the cams 52 and the cam follower 50 this continuous horizontal movement of the transfer bar 14 could not be assured.

As shown in FIG. 3, during the final portion of movement of the transfer bar 14 to the right, the follower roller 50 moves upwardly out of the first track section defined by the cams 52. When the drive crank 26 passes upwardly through the position in which it is generally horizontal and the pivot 28 is on the right side of the drive shaft 24, the transfer bar 14 changes its direction of movement from right to left, as illustrated in FIGS. 3 and 4. Prior to the time that the drive crank 26 reaches its upwardly extending vertical position, which occurs in between the positions illustrated in FIGS. 4 and 5, the roller 50 enters the second track section defined by the upper cam members 54. As a result, when the drive link 30 passes through a position in which it is parallel to the drive crank 26, the clockwise rotation of the drive link 30 is continued so that continuous horizontal movement of the carriage 34 from right to left as viewed in FIGS. 4 and 5 is uninterrupted. When the drive crank 26 passes through its horizontal position in which the pivot 28 is moving downwardly at a position between the drive shaft 24 and pin 32, the direction of movement of the carriage 34 is agian reversed and the carriage 34 commences moving toward the right as viewed in FIG. 2.

It can thus be seen that full circle rotation of the drive crank 26 can be separated into two half cycles of movement. The first half cycle of movement is defined by movement of the pivot 28 from a position horizontally aligned with the drive shaft 24 on the left side of the drive shaft 24 in an arcuate downward path to a position horizontally aligned with the drive shaft 24 and on the right hand side of the drive shaft 24. During this first half cycle of movement of the drive crank 26, the transfer bar 14 experiences simple harmonic motion and is moved from left to right. This half cycle movement of the drive crank 26 thus achieves what could be called a work stroke of the transfer bar 14 in which the bar 14 experiences simple harmonic motion. This motion has the low torque and acceleration and velocity characteristics that are deemed to be ideal for transfer bar movement in connection with the horizontal shifting of workpieces from one work station to the next. In the next half cycle movement of the drive crank 26, it moves in arcuate upward path and returns to its initial position on the left side of the drive shaft 26. During this movement of the crank 26, the transfer bar 14 also experiences simple harmonic motion so that this half cycle movement can also be utilized for work if desired.

Figure 8:
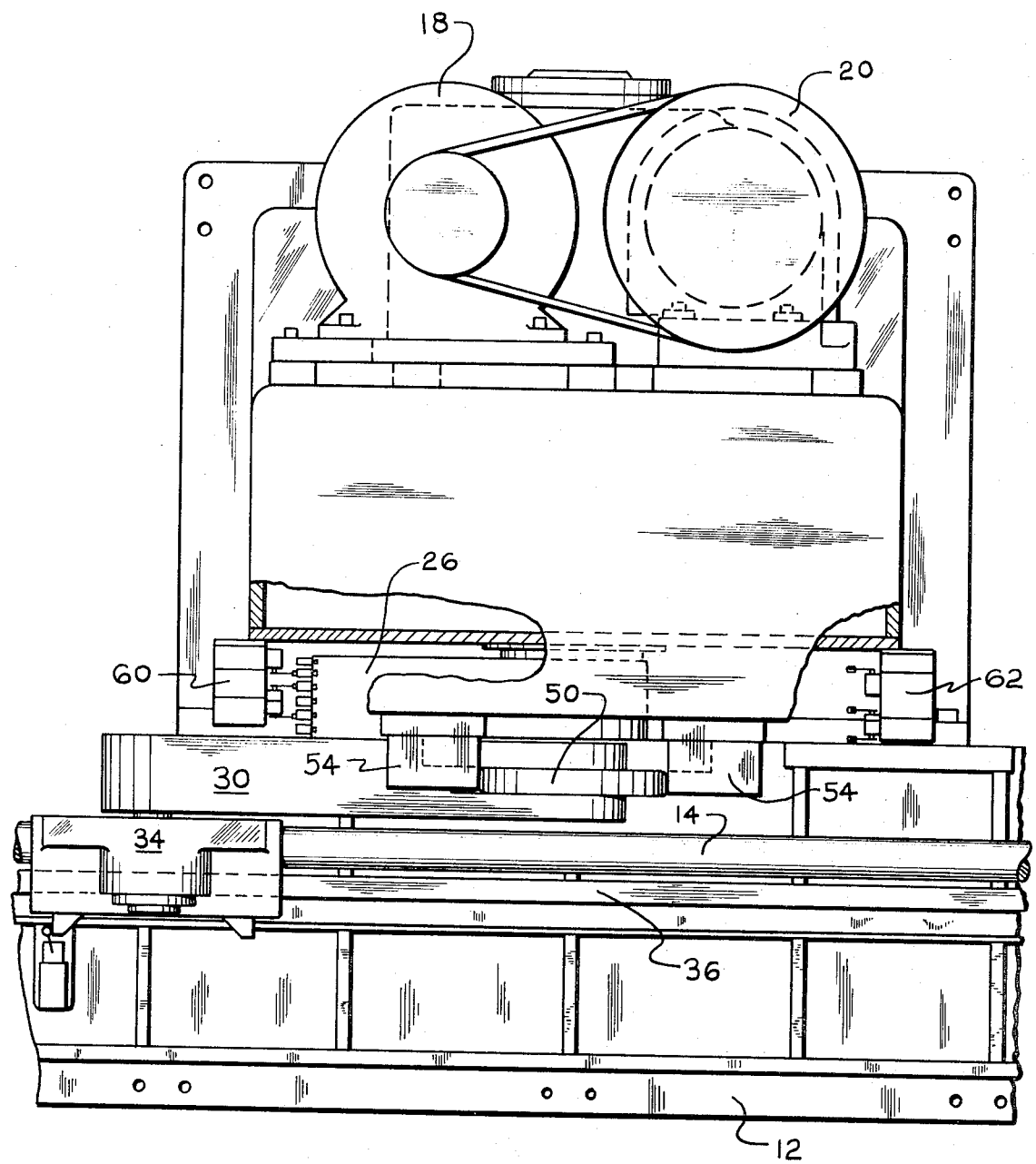
FIG. 8 is a top view of the transfer assembly shown in FIG. 1.
Figure 9:
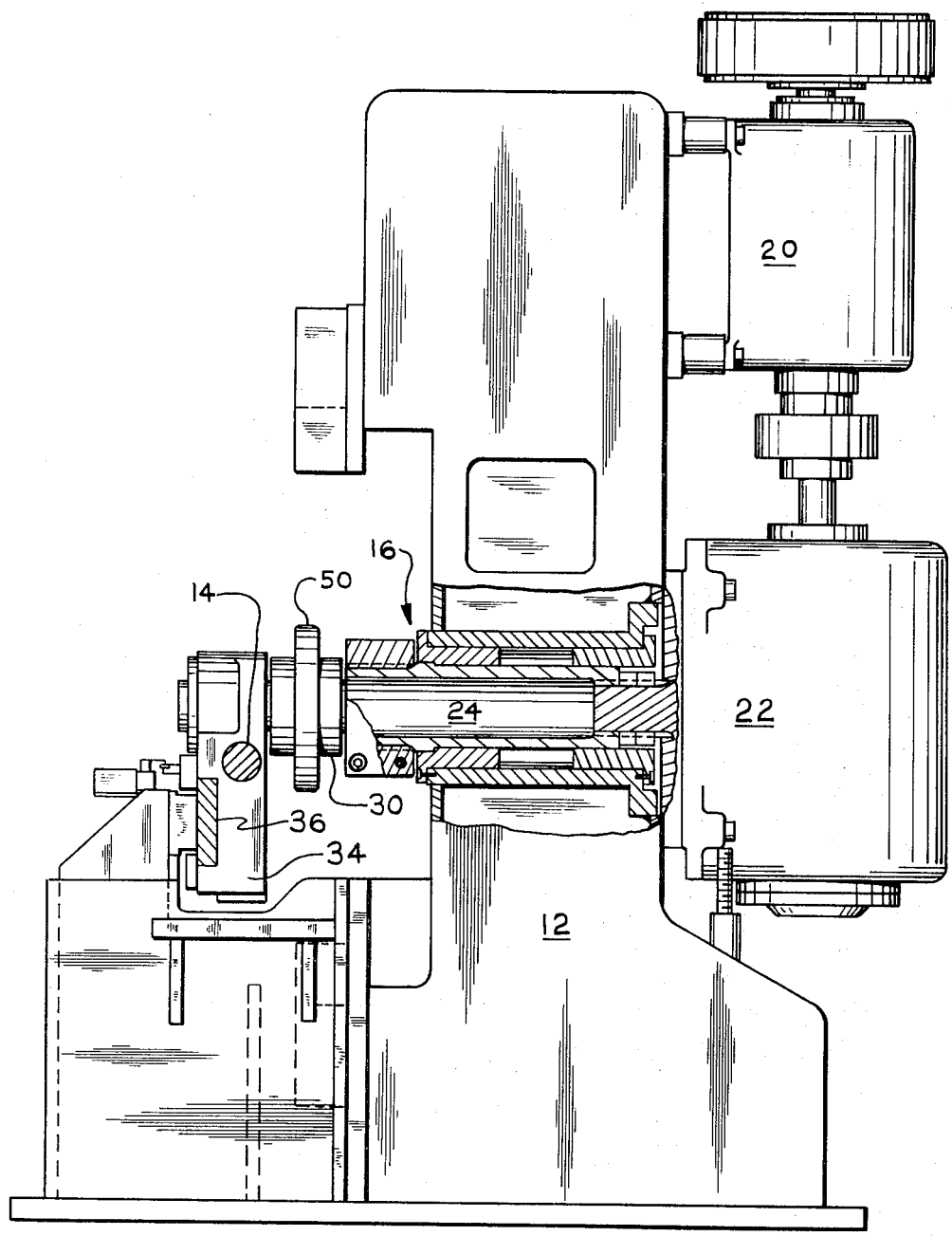
FIG. 9 is a side view of the transfer assembly, with some parts broken away and other parts shown in section for the purpose of clarity.

From the above description it is seen that this invention provides a mechanical transfer assembly 10 in which the transfer bar 14 is driven so as to achieve simple harmonic motion. This motion is controlled by a series of drive crank actuated switches 60 and 62, shown in FIGS. 1 and 8. As a result, rapid and accurate advance of workpieces from one work station to another can be achieved with a minimum power input. The clutch and brake assembly 20 is operated by the switches 60 and 62 so as to stop the transfer bar 14 in accurate positions at the end of each half cycle.

What is claimed is:

1. In a transfer mechanism for moving workpieces in a generally horizontal direction through a plurality of work stations, a main frame, a transfer bar mounted on said main frame for generally horizontal straight line movement, a drive mechanism for imparting simple harmonic motion to said transfer bar, said drive mechanism comprising a drive shaft, drive means for said drive shaft operable to continuously rotate said drive shaft through full cycles of movement, a drive crank having one end secured to said drive shaft so that said drive crank is movable through full cycles of movement, a drive link pivotally mounted intermediate its ends on the other end of said drive crank, means pivotally connecting one end of said drive link to said transfer bar, and coacting means on said frame and the opposite end of said drive link assuring continuous movement of said transfer bar in one direction in response to predetermined half cycle movement of said drive crank.

2. A drive mechanism according to claim 1 in which said coacting means includes means on said frame operable to restrain horizontal movement of said opposite end of said drive link when said drive link and said drive crank are in substantially parallel positions.

3. A drive mechanism according to claim 2 wherein said restraining means on said frame comprises cam means defining an upright track assembly, and follower means on said opposite end of said drive link movable into said track assembly immediately prior to movement of said drive link and drive crank into said substantially parallel positions.

4. A drive mechanism according to claim 3 wherein said cam means comprises a plurality of cam members defining a first track section disposed below said transfer bar and a second track section disposed above said transfer bar and spaced from said first track section.

5. A drive mechanism according to claim 3 wherein said follower means comprises a roller member engageable with said cam members.

6. A drive mechanism according to claim 1 wherein said means pivotally connecting said drive link to said transfer bar comprises a carriage member, means pivotally connecting said carriage member to said drive link, and means attaching said carriage member to said transfer bar.

7. A drive mechanism accoridng to claim 6 wherein said means attaching said carriage member to said transfer bar comprises means forming a cam shape recess in said transfer bar, and a spring pressed pin member mounted on said carriage member, and projecting into said recess.

8. A drive mechanism according to claim 7 further including a guide rail on said frame disposed in a substantially parallel relation with said transfer bar, and means slidably supporting said carriage on said rail.

* * * * *